Oct. 18, 1949.

C. A. BAKER ET AL 2,484,925

TEMPERING APPARATUS

Filed June 4, 1947

Inventors
CLYDE A. BAKER
AND RAY A. HINKLEY
By Knight & Fowler
Attorneys

Oct. 18, 1949.                C. A. BAKER ET AL                2,484,925
                                TEMPERING APPARATUS
Filed June 4, 1947                                          4 Sheets-Sheet 3

Inventors
CLYDE A. BAKER
AND RAY A. HINKLEY
By
Knight & Fowler
Attorneys

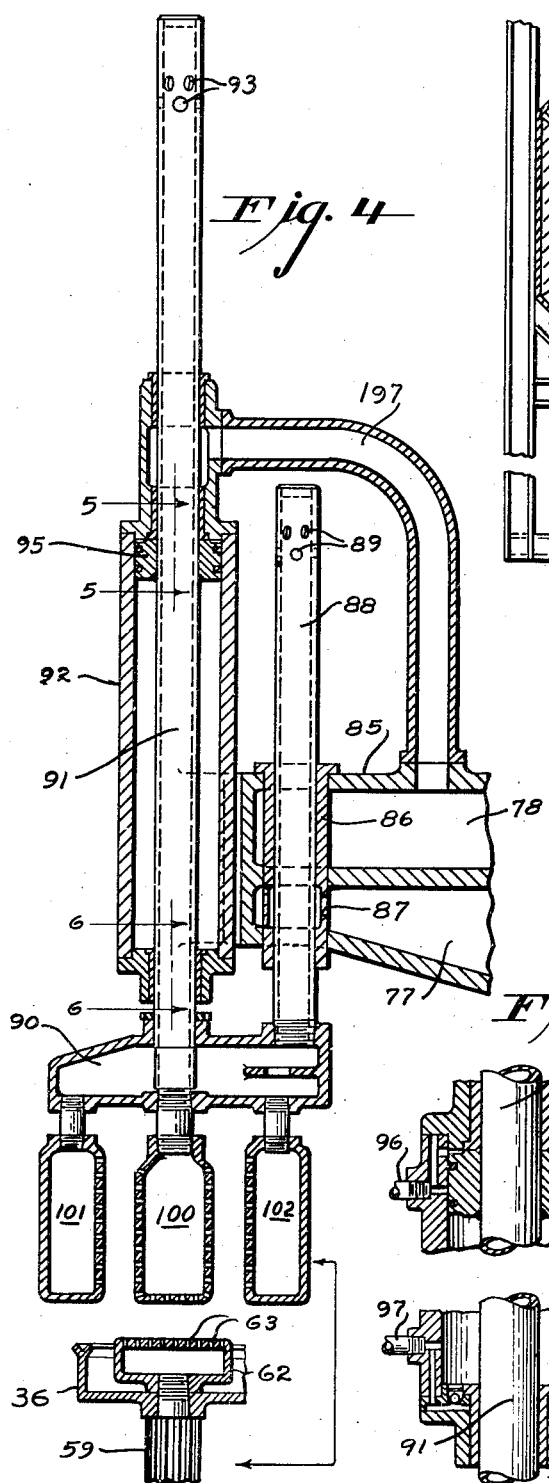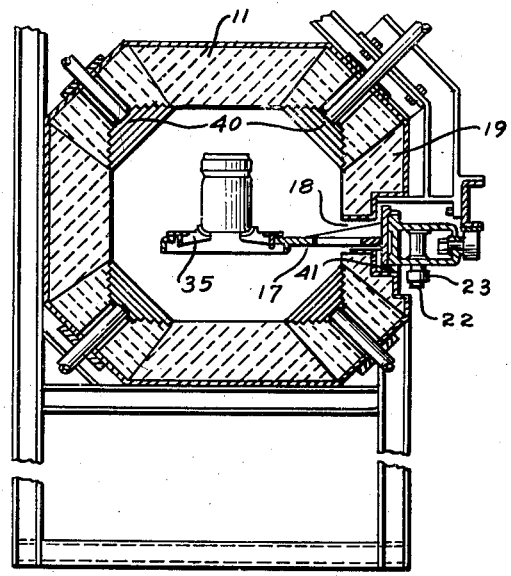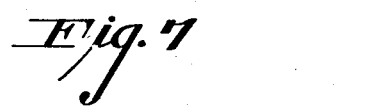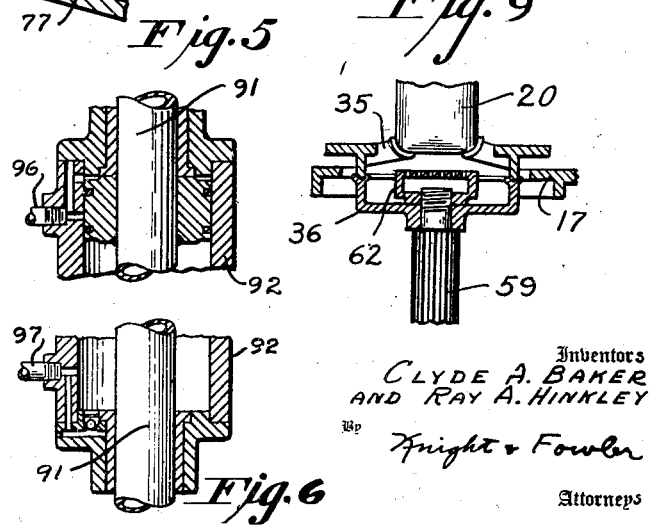
Inventors
CLYDE A. BAKER
AND RAY A. HINKLEY
By Knight & Fowler
Attorneys Patented Oct. 18, 1949

2,484,925

UNITED STATES PATENT OFFICE 2,484,925

TEMPERING APPARATUS

Clyde A. Baker, Corning, and Ray A. Hinkley, Steuben, N. Y., assignors to Corning Glass Works, Corning, N. Y., a corporation of New York Application June 4, 1947, Serial No. 752,490

10 Claims. (Cl. 49—47)

The present invention relates to glass treating apparatus and particularly to the tempering of glass ware to give it greater thermal endurance and mechanical strength.

In general, the object of the invention is the tempering of glassware in a rapid and efficient manner. More specifically, the object is a wholly mechanized apparatus for conveying ware through a suitably heated atmosphere and for then subjecting the ware to streams of chilling fluid while effecting relative movement between the ware and the roots of the streams to temper it in a desired manner.

The foregoing objects are realized in a structure comprising a conveyer having an endless path through a kiln and about a turret type chilling or tempering apparatus arranged adjacent the exit end of the kiln and adapted to lift the ware from the conveyer, temper it, and redeposit it on the conveyer from which it can be transferred to a conveyer for carrying it to its final destination, as, for example, an inspection and packing area.

A particularly important feature of the invention includes an arrangement wherein the support for the ware is not only heated along with the ware but continues to carry the ware while it is being tempered.

A further feature includes facilities for preheating the support, which has been chilled along with the ware, before reuse in conveying ware through the kiln.

Another feature is a heating kiln for the ware in which the ware is supported through a horizontal slot in a vertical side wall enabling a more uniform temperature to be maintained in the kiln than when access thereto is had through the bottom or top wall thereof.

In the accompanying drawings Figs. 1 and 2 together comprise a plan view, with certain parts in Fig. 2 broken away, of an embodiment of the invention suitable for heating hollow articles of ware to a desired temperature and for then subjecting them to streams of chilling fluid to temper them in a desired manner.

Fig. 4 is an enlarged sectional view taken on line 4—4 of Fig. 2.

Fig. 5 is an enlarged sectional view taken on line 5—5 of Fig. 4.

Fig. 6 is an enlarged sectional view taken on line 6—6 of Fig. 4.

Fig. 7 is an enlarged sectional view taken on line 7—7 of Fig. 1.

Fig. 8 is a fragmentary view showing the mechanical means employed to retard the speed of lifting the ware supports.

Fig. 9 is an enlarged view of a fragment of the apparatus shown in the right-hand portion of Fig. 3.

Figure 1:
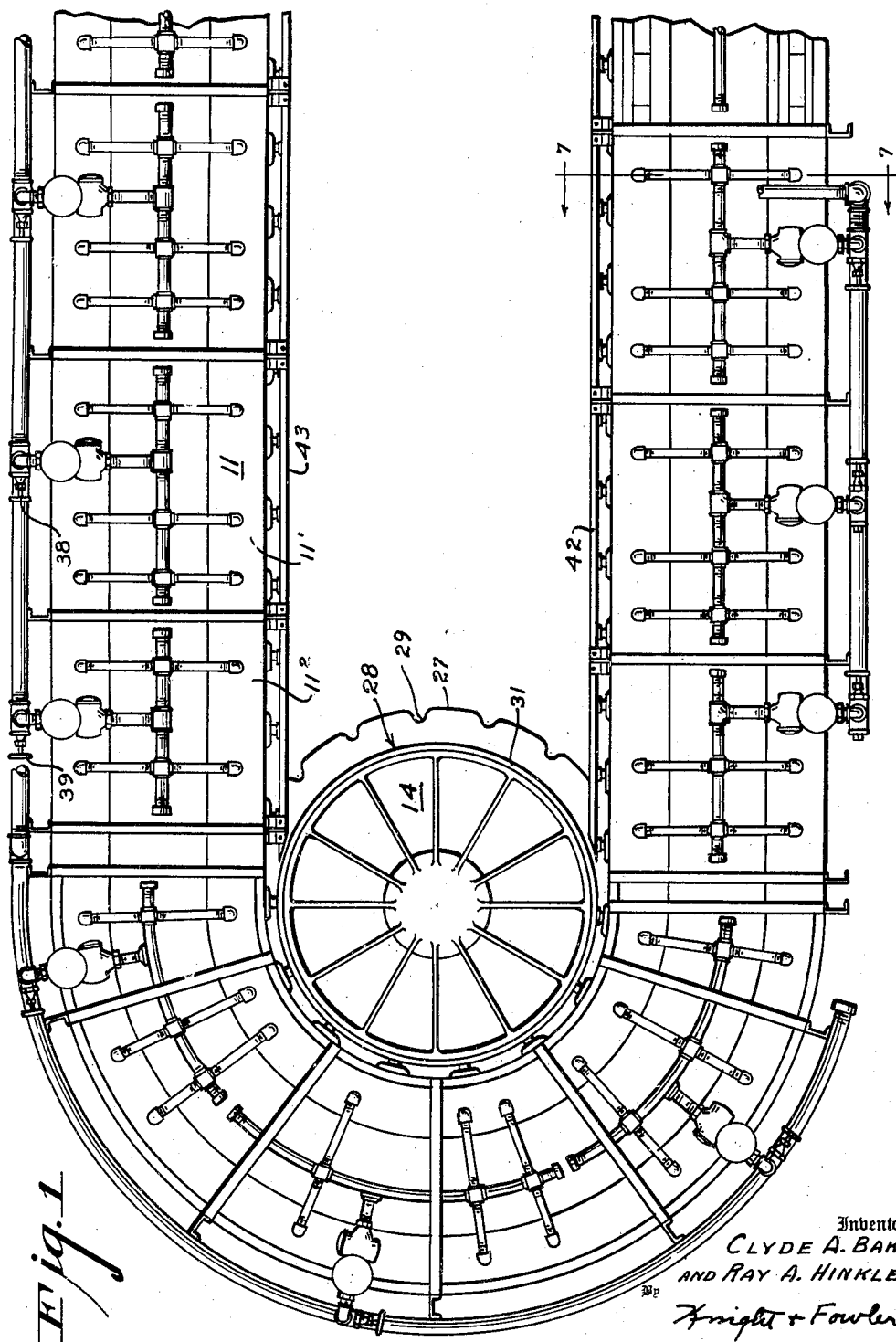

In the illustrated embodiment of the invention the apparatus comprises a heating kiln 11 of U configuration in plan, a conveyer 12 trained about a chilling or tempering turret 13 in the vicinity of the entry and exit 15 and 16 of the kiln and about an idler turret 14 at the base of the U. Conveyer 12 has portions 17 projected into the kiln 11 through a horizontal slot 18 (Figs. 3 and 7) through the inner wall thereof. Portion 17 has a ware support 35 resting thereon which is raised and rotated by a platform 36 (Fig. 3) of turret 13 while ware supported thereon is subjected to streams of chilling fluid as the ware is conveyed about the turret. Before the paths of travel of platform 36 and conveyer portion 17 separate, the platform 36 is again lowered and the ware support 35 is thus redeposited on conveyer support portion 17. As will be understood, a tempered piece of ware 20, for example (Fig. 3), is removed from support 35 and replaced with a piece of ware to be tempered after becoming disassociated from turret 13 and before a conveyer support portion 17 again enters kiln 11.

Conveyer

Figure 2:
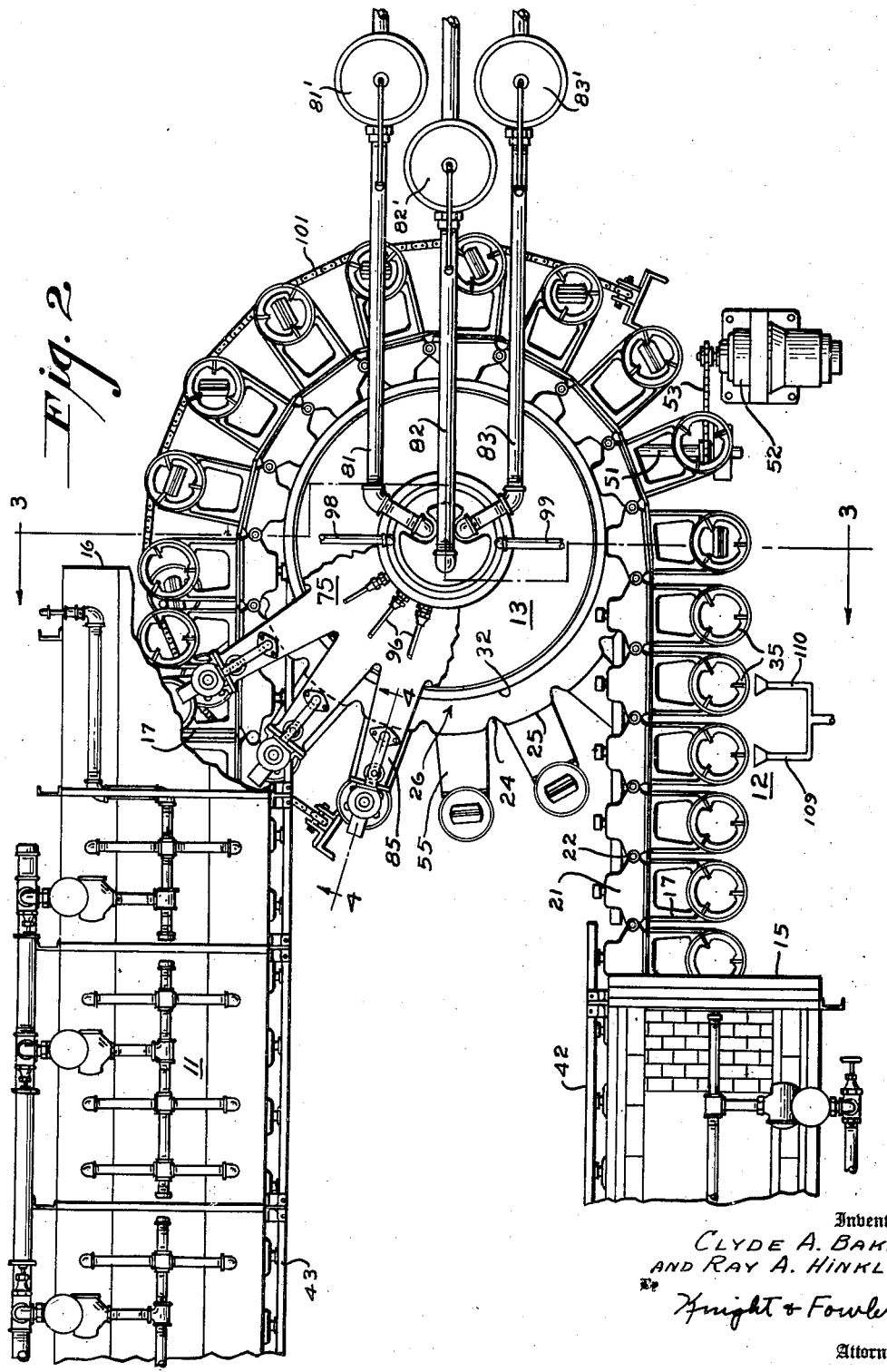
Figure 3:
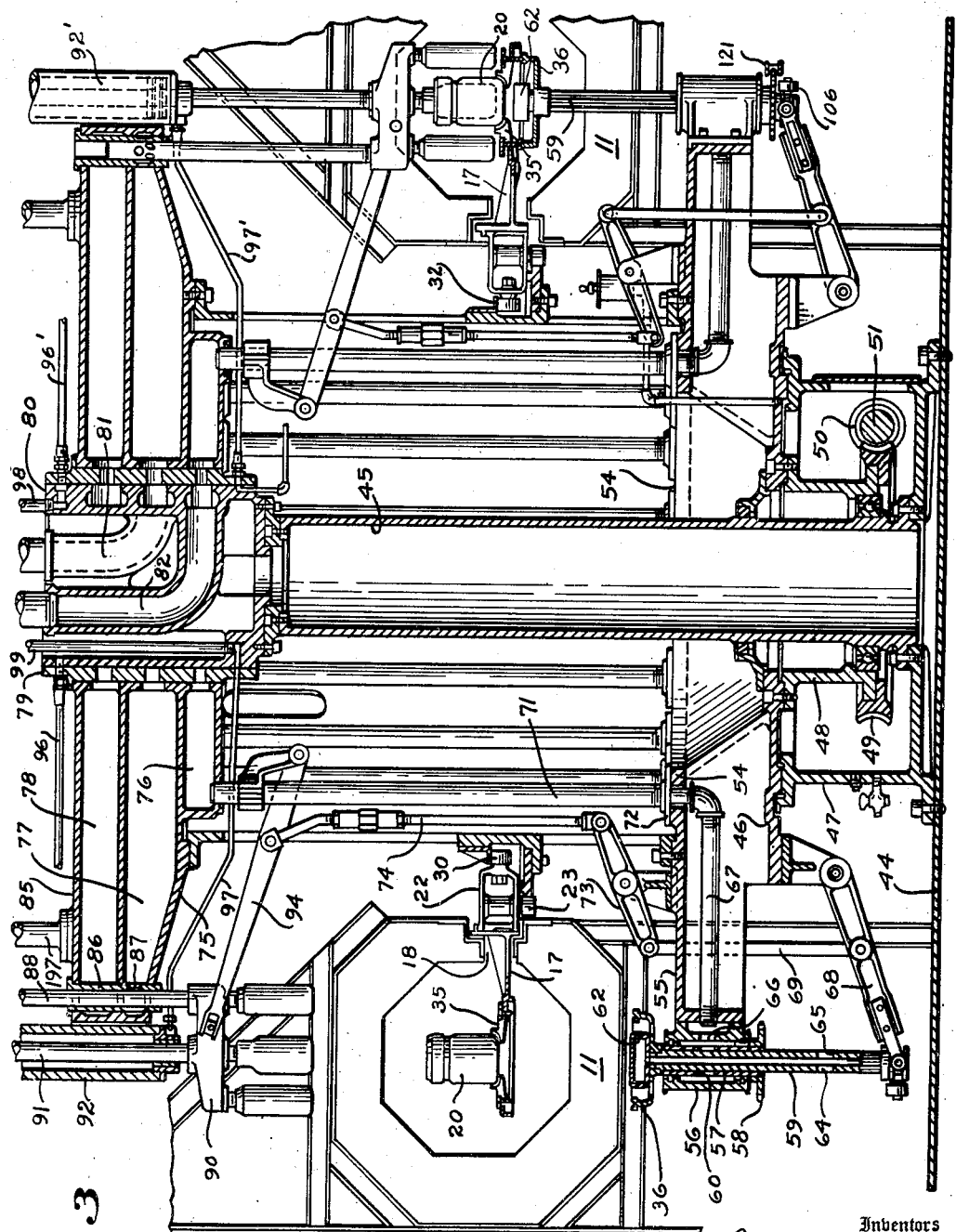
Fig. 3 is an enlarged sectional elevation taken on line 3—3 of Fig. 2.

The conveyer 12 comprises segment or link portions 21 (Fig. 2) pivotally connected to one another by pins 22 whose bottom ends carry rollers 23 (Figs. 3 and 7) adapted to enter notches 24 (Fig. 2) between teeth 25 of a drive wheel 26 of turret 13 and to enter notches 29 (Fig. 1) between teeth 27 of a wheel 28 comprising part of turret 14. While passing about turrets 13 and 14, link portions 21 are also supported on wheels 26 and 28 and are maintained in a horizontal plane by means of rollers 30 thereof riding against the underside of circular tracks 31 (Fig. 1) and 32 (Figs. 2 and 3).

Kiln

The kiln 11 is of usual refractory construction of octagonal configuration in cross-section and has rows of surface combustion burners such as 40 (Fig. 7) arranged through the slanting walls thereof throughout its length. The kiln 11 is divided into a plurality of sections, such as sections 11¹ and 11² (Fig. 1) for example. The burners of sections 11¹ and 11² and the others of the kiln are provided with separate control valves, such as valves 38 and 39, so that desired temperature conditions can be readily established within the kiln. Products of combustion pass out of the kiln via the horizontal slot 18 through which link portions 17 of conveyer 12 project into the interior of the kiln. A wear plate 41 (Fig. 7) is provided on the bottom wall of slot 18 on which portions 17 are slidably supported while passing through the kiln 11. To maintain conveyer portions 17 in their horizontal position while passing through kiln 11, rails 42 and 43 (Figs. 1 and 2) are provided whose under surfaces become engaged by the rollers 30 of the respective conveyer link portions 21 soon after leaving the under sides of turret tracks 32 and 31.

Turret assemblies

Turret 13 (Fig. 3) includes a base 44 to which is attached a drum 47 having mounted thereon a tubular column 45. Arranged about the lower end portion of column 45 is a table 46 having a hub 48 provided with a worm wheel 49 adapted to be rotated about column 45 by means of a worm 50 carried by a shaft 51 driven by a motor 52 (Fig. 2) through the medium of a chain 53. A second table 54, above and integral with table 46, is provided with radiating arms 55 (Figs. 2 and 3) each having a hub 56 at its free end to accommodate a tubular axle 57 having a sprocket wheel 58 attached to its lower end. A splined shaft 59 passes through the bore of axle 57 and at its bottom end is coupled to one end of a lever 68, the operation of which will be explained later. The top end of shaft 59 carries one of the previously described platforms 36, and within the confines of platform 36 is a chilling nozzle 62 provided with suitable apertures 63.

Nozzle 62 is adapted to receive chilling fluid via the bore of shaft 59 in its raised position in which position it has horizontal apertures 64 and 65 in alignment with an aperture 60 in axle 57 and apertures 66 in hub 56 and which are at all times in communication with a chilling air supply pipe 67. Pipe 67 is coupled to one of a series of vertically disposed pipes 71 threaded through supporting flanges 72 arranged over apertures in table 54 on which they are supported and arranged in an annular row about column 45. The upper ends of pipes 71 communicate with the interior of a chamber 76 of a circular fluid supply box 75 also having chambers 77 and 78. Box 75 has a hub 79 comprising walls of its chambers 76—78 and through which walls are apertures to pass fluid from a distributing sleeve 80 carried at the top of column 45 and entered by fluid supply lines 81—83 (Figs. 2 and 3) supplied with compressed air through suitable pressure regulators 81', 82' and 83'. The box 75 is further provided with radiating arms 85 (Figs. 2 and 4) in vertical register with arms 55. Each arm 85 at its free end contains a sleeve 86 having an aperture 87 in communication with chamber 77 and with its bore occupied by a vertically slidable tubular shaft 88. Shaft 88 is closed at its top end and at its bottom end is threaded into an air distributing chamber 90. Chamber 90 is supported on a tubular shaft 91 passing through chamber 90 and through a cylinder 92 integral with sleeve 86 and containing a piston 95 attached to shaft 91. As shown in Figs. 5 and 6, air supply lines 96 and 97 are in communication with the upper and lower ends of cylinder 92 for lowering and raising shaft 91. Air supply line 96 is alternately connected to atmosphere and a main air supply line 98 (Fig. 3) and similarly air supply line 97 is alternately connected to supply line 99 and to atmosphere via suitable ports in hub 79 and sleeve 80 in the proper sequence to raise and lower shaft 91 while a piece of ware is being conveyed about turret 13. In the position of the parts as shown in Fig. 3, the cylinder 92 is receiving air from its line 97 and is being exhausted to atmosphere via its line 96, whereas the reverse situation exists as regards the similar cylinder 92' and lines 96' and 97'. Depending from chamber 90 (Fig. 4) in axial alignment with shaft 91 is a nozzle 100 having a desired pattern of apertures across the bottom and along opposite sides thereof and adapted to be supplied with chilling fluid via the bore of shaft 91 when in its lower position, which is the same position at which fluid is supplied to chamber 90 and from which depend nozzles 101 and 102 in communication with chamber 90 and having oppositely disposed apertures directed toward the side wall apertures of nozzle 100. The air supplied to the bore of shaft 91 passes from chamber 78 through a conduit 197 and apertures 93 in the wall of shaft 91, while the air supplied to the bore of shaft 88 and chamber 90 passes from chamber 77 through aperture 87 and apertures 89 through the wall of shaft 88.

The raising and lowering of platform 36 (Fig. 3) and its associated nozzle 62 is by a mechanical linkage with air chamber 90 comprising lever 68, a connecting rod 69, a rocker arm 73, a connecting rod 74 and a lever 94, the latter lever being pivoted to air chamber 90. The foregoing mechanical linkage is such that as chamber 90 is lowered to introduce nozzle 100 into an article of ware as such article and its support 35 are lifted off conveyer portion 17 and are rotated about their own axes through the engagement of sprocket wheel 58 with a stationary chain 121 trained thereabout during the travel of the ware about turret 13. During such travel air is impinged against the outer side walls of the article by nozzles 101 and 102 and on the bottom surface thereof by nozzle 62. At the same time air is impinged against the inner side walls and inner bottom wall surfaces of the article by nozzle 100.

As will be understood for best results, the application of chilling fluid to the ware should occur at the earliest possible moment after the ware leaves the kiln 11. With this in view, the piston 95 and cylinder 92 in which it operates are of such size and operated by air at a pressure to produce rapid movement of the chilling nozzles to their active positions. To positively reduce the speed of movement of piston 95 just before platform 36 engages and lifts support 35, to assure a smooth pick up of the ware, piston 95, near the end of its stroke, is arranged to block the direct passage of air through pipe 97 (Fig. 6) to atmosphere so that the air trapped under piston 95 acts as a cushion to its final movement. An auxiliary cam means may further be employed to assure reduction of speed of movement of the platform 36 just before it engages a support. This auxiliary means may comprise a fixed cam 105 (Fig. 8) whose cam surface 107 is adapted to be encountered by a roller 106 (Figs. 3 and 8) at about the time air is supplied to the upper end of cylinder 92. The contour of surface 107 of cam 105 is such that raising of platform 36 by piston 95 is mechanically retarded to a speed dependent jointly on the cam contour and the speed of travel of turret 13.

Support preheating

The supports 35 are substantially cooled by the chilling medium which issues from nozzles 62 so that to avoid excess thermal shock to hot ware placed on supports 35 it is desirable to preheat them. This may be accomplished by enclosing a short section of the conveyer 12 with a preheat kiln spaced between the entry end of kiln 11 and the turret 13, or by providing suitable flame heaters for this purpose. For simplicity's sake, burners 109 and 110 (Fig. 2) are diagrammatically shown for preheating supports 35 as they leave the path of travel about the turret.

In brief, the operation may be summarized as follows: An article is placed on one of the supports 35 after it passes burners 109 and 110 and before such support enters kiln 11. The article passes through the kiln where it attains the proper temperature for tempering. As the article issues from the kiln and joins the path of travel of a set of chilling nozzles, such nozzles are simultaneously moved into association with the article; the article and its support lifted from the conveyer and rotated and the passages for supplying chilling fluid to the nozzles opened. After the appropriate chilling period, the support is redeposited on the conveyer ready for transfer to a conveyer leading to a packing area or the like.

We claim:

1. In a glass article treating apparatus, a turret, an endless conveyer having a path of travel extending part way around said turret, article supports arranged on said conveyer, devices associated with said turret for lifting said supports from said conveyer and for returning them thereto in the course of their travel about said turret, means for rotating said devices about their own vertical axes so that articles of ware on said supports are rotated while in their lifted positions, and means for directing a fluid medium against the surfaces of articles of ware while they are being rotated about their own axes.

2. In a glassware tempering apparatus, a kiln of U configuration in plan for heating ware passed therethrough to a condition suitable for tempering and having a continuous horizontal slot through a side wall thereof, an endless conveyer having portions uniformly spaced from one another along the length of said conveyer projecting through said slot into the interior of said kiln, a turret arranged generally between the open ends of the kiln and about which said conveyer travels, ware supports normally resting on the portions thereof which project into said kiln, means for rotating said turret and for driving said conveyer, devices rotatable about their own vertical axes associated with said turret for raising said ware supports off said conveyer during a portion of their travel about said turret and for then lowering such supports to their initial positions of rest on said conveyer, means for rotating said devices about their axes whereby rotation of said supports is effected while they are raised off said conveyer, and means for directing a chilling medium against surfaces of articles of ware arranged on said supports while they are being rotated about the axes of their supports.

3. In a glassware tempering apparatus, a continuously moving conveyer, ware supports uniformly spaced along said conveyer normally resting thereon and being conveyed thereby, a turret about which said conveyer travels having support lifting platforms arranged under the respective supports and traveling at the same speed as the conveyer, means associated with said turret for raising said support lifting platforms until they engage and lift said supports off said conveyer and for thereafter lowering said platforms to return said supports to their original positions on said conveyer, and means for imparting a tempering treatment to pieces of ware arranged on said supports while such supports are lifted off said conveyer.

4. In a glassware tempering apparatus a kiln, means for establishing temperature in said kiln suitable for raising the temperature of a piece of glassware as it passes therethrough to that temperature most suitable for chilling desired compressive stresses in the surfaces thereof, an endless conveyer having portions passing through said kiln uniformly spaced from one another along the length of said conveyer, a turret outside said kiln about which said conveyer travels, means for rotating said turret and for driving said conveyer, ware supports normally freely resting on said conveyer portions, means associated with said turret for lifting said ware supports from said conveyer portions during the initial travel of the supports about said turret and for at the same time rotating said raised supports about vertical axes passing through the respective supports and for thereafter again lowering said supports onto said conveyer portions as travel of the conveyer continues about said turret, and means for applying chilling air to the interior and exterior surfaces of pieces of hollow ware arranged on said supports while said supports are in their lifted position.

5. In a glassware tempering apparatus a kiln, means for establishing temperature in said kiln suitable for raising the temperature of a piece of glassware as it passes therethrough to that temperature most suitable for chilling desired compressive stresses in the surfaces thereof, an endless conveyer having portions passing through said kiln uniformly spaced from one another along the length of said conveyer, a turret outside said kiln about which said conveyer travels, means for rotating said turret and for driving said conveyer, ware supports normally freely resting thereon, means associated with said turret for lifting said ware supports from said conveyer portions during the first portion of travel about said turret, nozzles for applying a chilling medium to surfaces of articles of ware arranged on said supports during a selected distance of their travel while they are in the lifted position, and means for effecting relative movement between said supports and nozzles while the chilling medium is being applied.

6. In a glass tempering apparatus a kiln having a vertical side wall with a passage therethrough throughout the length of said side wall, a conveyer having a path of travel along said side wall and having a portion projecting through said passage, an article support resting on said conveyer portion, means along the path of travel of said conveyer beyond the exit end of said kiln for lifting and rotating said support about its own vertical axis while conveying it in unison with said conveyer portion and for thereafter redepositing said support thereon before said portion re-enters said kiln, and means for directing a chilling medium against the inner and outer surfaces of an article arranged on said support while the same is rotating about its own vertical axis.

7. In a glassware tempering apparatus, a continuously moving conveyer, ware supports uniformly spaced along said conveyer normally resting thereon and being conveyed thereby, a turret about which said conveyer travels having support lifting platforms arranged under the respective supports and traveling at the same speed as the conveyer, a kiln through which said conveyer carries said supports, means associated with said turret for raising a support lifting platform under a support substantially immediately after its issuance from said kiln to lift such support clear of said conveyer and for thereafter lowering said platform to return said support to said conveyer, means for in the meantime applying a chilling medium to an article of ware on said support, and means for preheating said support substantially immediately after it leaves said turret and before it re-enters said kiln.

8. In a tempering apparatus such as defined by claim 3, means for retarding the speed of raising of the platform immediately preceding its engagement of said support.

9. In a tempering apparatus such as defined by claim 3, pneumatic means for retarding the speed of raising of said platform immediately preceding its engagement of said support.

10. In a tempering apparatus such as defined by claim 3, a device for mechanically retarding the speed of raising of said platform immediately preceding its engagement of said support.

CLYDE A. BAKER.
RAY A. HINKLEY.

REFERENCES CITED

The following references are of record in the file of this patent:

UNITED STATES PATENTS

| Number | Name | Date |
|---|---|---|
| 1,514,122 | Archer | Nov. 4, 1924 |
| 2,375,944 | Quentin | May 15, 1945 |
| 2,377,536 | Wisner | June 5, 1945 |